(12) United States Patent
Kusaka et al.

(10) Patent No.: US 8,074,756 B2
(45) Date of Patent: Dec. 13, 2011

(54) STRADDLE-TYPE ROUGH-ROAD RUNNING VEHICLE

(75) Inventors: Takuya Kusaka, Hamamatsu (JP); Yuzo Hioki, Hamamatsu (JP)

(73) Assignee: Suzuki Kabushiki Kaisha, Hamamatsu-shi, Shizuoka-ken (JP)

( * ) Notice: Subject to any disclaimer, the term of this patent is extended or adjusted under 35 U.S.C. 154(b) by 269 days.

(21) Appl. No.: 11/830,269

(22) Filed: Jul. 30, 2007

(65) Prior Publication Data

US 2008/0289892 A1 Nov. 27, 2008

(30) Foreign Application Priority Data

Aug. 9, 2006 (JP) ................... 2006-216745

(51) Int. Cl.
*B60K 13/02* (2006.01)

(52) U.S. Cl. ...... 180/68.3; 180/68.1; 180/225; 180/296; 180/309

(58) Field of Classification Search ............ 180/225, 180/229, 296, 309, 68.1–68.4, 68.6
See application file for complete search history.

(56) References Cited

U.S. PATENT DOCUMENTS

| 4,723,617 A | * | 2/1988 | Kitada | 180/68.1 |
| 4,809,800 A | * | 3/1989 | Suzuki | 180/219 |
| 5,211,255 A | * | 5/1993 | Fukuda | 180/219 |
| 6,622,806 B1 | * | 9/2003 | Matsuura | 180/68.1 |
| 6,695,083 B2 | * | 2/2004 | Nakamura et al. | 180/68.1 |
| 6,820,708 B2 | * | 11/2004 | Nakamura | 180/68.2 |
| 6,823,956 B2 | * | 11/2004 | Shimizu | 180/68.1 |
| 6,920,949 B2 | * | 7/2005 | Matsuura et al. | 180/68.2 |
| 7,210,547 B2 | * | 5/2007 | Nojima | 180/68.3 |
| 2005/0205325 A1 | * | 9/2005 | Nojima | 180/219 |

FOREIGN PATENT DOCUMENTS

| JP | 2843570 | 1/1999 |
| JP | 2000-313385 A | 11/2000 |
| JP | 2005-315214 A | 11/2005 |

* cited by examiner

*Primary Examiner* — J. Allen Shriver, II
*Assistant Examiner* — Erez Gurari
(74) *Attorney, Agent, or Firm* — Barnes & Thornburg LLP

(57) ABSTRACT

A straddle-type rough-road running vehicle includes a vehicle body frame supporting front and rear wheels, an engine unit mounted to the vehicle body frame and including an engine body and a power transmission case, a straddle type driver's seat, an intake control unit for controlling an air/fuel ratio, and an air-cleaner case for supplying a clean air to the intake control unit. The intake control unit and the air-cleaner case are connected to each other, and the air-cleaner case is disposed above the power transmission case. An engine mounting portion is formed in a frame shape opened such that the engine unit is surrounded from a vertical direction and a longitudinal direction. The engine body, the power transmission case, the intake control unit, and the air-cleaner case are disposed in an arrangement offset from the engine mounting portion in a side view.

3 Claims, 4 Drawing Sheets

STRADDLE-TYPE ROUGH-ROAD RUNNING VEHICLE

CROSS-REFERENCE TO RELATED APPLICATIOINS

This application is a U.S. Patent Application based upon and claiming the benefit of priority to JP 2006-216745, filed on Aug. 9, 2006, the contents of which are incorporated herein by reference.

BACKGROUND OF THE INVENTION

1. Field of the Invention

The present invention relates to a straddle-type rough-road running vehicle, more particularly, in which an assembling performance of a vehicle body is improved.

2. Related Art

A straddle-type rough-road running vehicle or an automatic motorcycle is mounted with an engine unit which is formed by integrally combining a belt-type stepless transmission (change gear) with an engine body. In order to prevent an adverse influence of heat, generated by an operation of the transmission, on a V-shaped belt or seal members of the transmission, the engine unit is provided with a belt-cooling device.

The belt-cooling device has a function of introducing a fresh air as a cooling wind through an intake port and a duct from an external portion into a portion, for example, i.e., a belt case in which the transmission is accommodated. Parts and members in the belt case are cooled by the cooling wind. Thereafter, the cooling wind is transferred through, for example, another duct and then discharged from an outlet port to the atmosphere.

Further, since it is not preferable for the flowing air introduced into the belt case to contain any moisture (water) content, a liquid/gas separating member having a box-shape is provided to an air intake duct at the most upstream side thereof.

Such conventional straddle-type rough-road running vehicles are disclosed in, for example, the following three patent documents: Japanese Patent No. 2843570; Japanese Patent Laid-open (KOKAI) Publication No. 2000-313385; and Japanese Patent Laid-open (KOKAI) Publication No. 2005-315214.

However, the intake port and the outlet port provided to the belt case are usually arranged to a central portion of the vehicle body frame in a longitudinal direction or an outside portion in the width direction of the vehicle body frame, so that it has been obliged to layout an intake duct and an outlet duct so as to be connected to the intake port and the outlet port in a very complicated manner, thus involving inconvenient working or labor and deteriorating an assembling performance of the vehicle body.

SUMMARY OF THE INVENTION

The present invention was conceived in consideration of the above circumstances in the prior art, and an object thereof is to provide a straddle-type rough-road running vehicle capable of achieving improved assembling performance of the vehicle body with high production efficiency.

The above and other objects can be achieved according to the present invention by providing a straddle-type rough-road running vehicle comprising:

a vehicle body frame;

a lateral pair of front wheels and a lateral pair of real wheels which are supported by the vehicle body frame;

an engine unit mounted to the vehicle body frame at substantially a central portion thereof in a longitudinal direction and including an engine body and a power transmission case, in which the engine body has a cylinder assembly extending from a crankcase;

a straddle type driver's seat disposed above a rear portion of the engine unit;

an intake control unit for controlling an air/fuel ratio so as to prepare air/fuel mixture which is supplied into a combustion chamber disposed in the cylinder assembly; and an air-cleaner case for supplying a clean air to the intake control unit, wherein the intake control unit and the air-cleaner case are connected to each other; the air-cleaner case is disposed above the power transmission case; an engine mounting portion is formed in a frame shape opened such that the engine unit is surrounded from a vertical direction and a longitudinal direction; and the engine body, the power transmission case, the intake control unit, and the air-cleaner case are disposed in an arrangement offset from the engine mounting portion in a side view.

In a preferred embodiment of the above aspect of the straddle-type rough-road running vehicle, it may be desired to further comprise an engine exhaust device which includes: an exhaust pipe connected to an exhaust port formed to the cylinder assembly; and an exhaust silencer connected to a downstream side end of the exhaust pipe, wherein the exhaust pipe is divided in a longitudinal direction at a portion which is a front side of the exhaust silencer and in the opened frame of the engine mounting portion formed in the vehicle body frame; and a front portion of the divided exhaust pipe and a rear portion of the divided exhaust pipe including the exhaust silencer are detachably connected by means of a joint portion.

It may be further desired that the power transmission case is provided with a cooling air intake port and a cooling air exhaust port, which are respectively connected to one side ends of an intake duct and an exhaust duct, and the other side ends thereof are extended to an upper space disposed above the engine unit within the frame of the engine mounting portion formed in the vehicle body frame; and an induction box for separating a gas and a liquid from a fresh air is connected to a most upstream side end portion of the intake duct; and the induction box is detachably fixed to the air cleaner case so as to communicate with the air cleaner case so that the induction box supplies a cooling air to the power transmission case and a clean air to the intake control unit, respectively.

It may be also desired that the power transmission case is provided with a cooling air intake port and a cooling air exhaust port, which are respectively connected to one side ends of an intake duct and an exhaust duct, and other side ends thereof are extended to an upper space disposed above the engine unit within the frame of the engine mounting portion formed in the vehicle body frame; an induction box for separating a gas and a liquid from a fresh air is connected to a most upstream side end portion of the intake duct so as to supply a cooling air to the power transmission case; and the induction box is arranged outside of the frame of the engine mounting portion and provided below a front fender disposed to a portion between one of the front wheels and a front side portion of the vehicle body frame.

According to the straddle-type rough-road running vehicle having the above characteristic features or structures, the main parts or members such as the engine body, other peripheral equipment can be mounted on the body frame in a state in which the main parts or the like are assembled in advance, so that the assembling performance of the vehicle body is effectively improved. Thus, it becomes possible to manufacture the vehicle with high production efficiency.

Further, the main parts or members such as the engine body or the like which have relatively weight or mass can be disposed in the concentrated manner to the central portion of the vehicle, so that the standing stability and steering performance of the vehicle can be greatly improved.

In addition, the concentrated arrangement of the main parts or members at the central portion of the vehicle body can eliminate complicated wiring or long connection therebetween, which may result in reduction of power loss.

The nature and further characteristic features of the present invention will be made clearer from the following descriptions made with reference to the accompanying drawings.

DESCRIPTION OF THE PREFERRED EMBODIMENT

Figure 1:
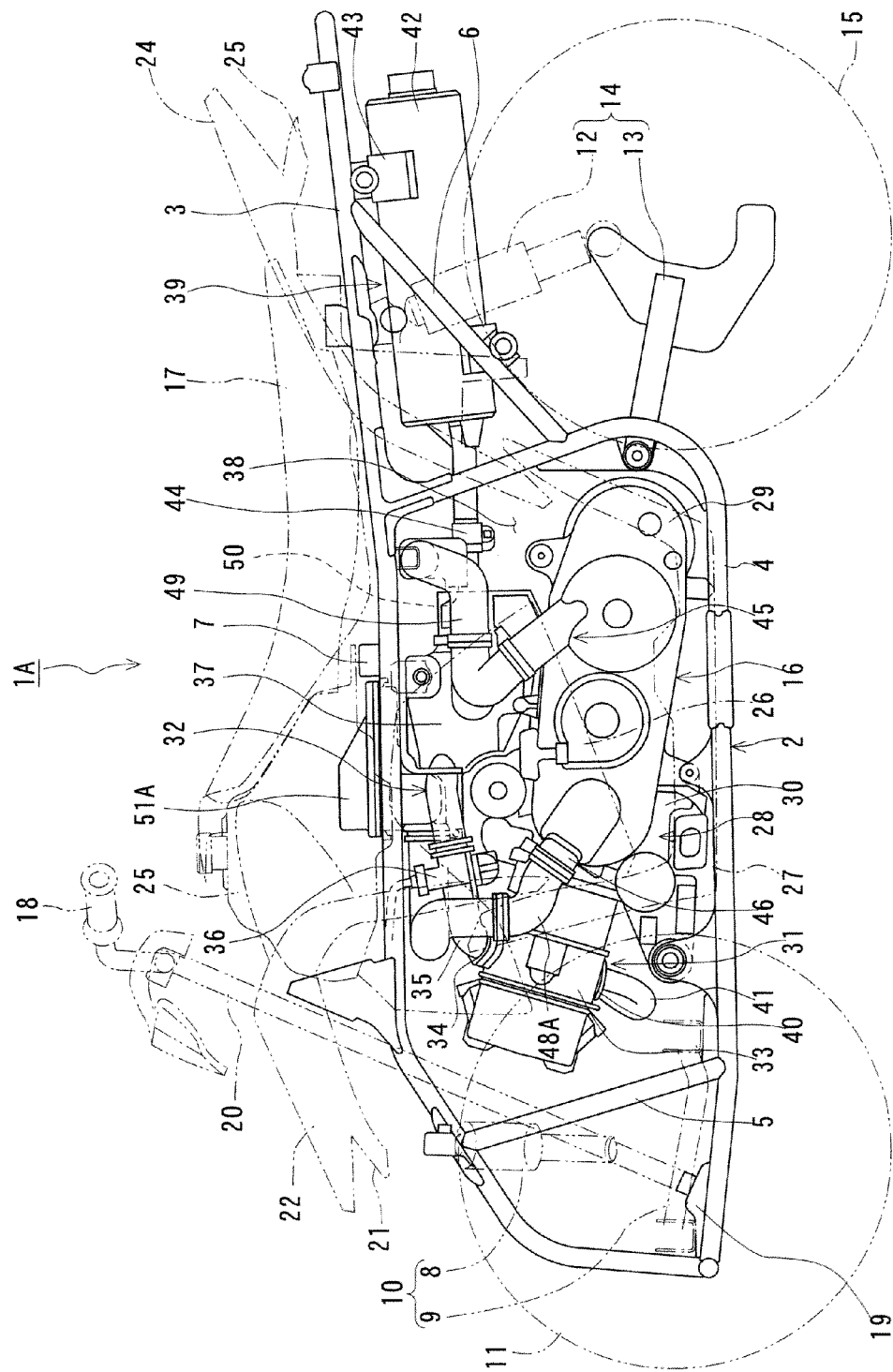
FIG. 1 is a schematic left side view of a straddle-type rough-road running vehicle, from which a body cover is removed, according to a first embodiment of the present invention.

A preferred embodiment of the present invention will be described hereunder with reference to the accompanying drawings. Further, it is to be noted that terms "right", "left", "upper", "lower" and the like terms are used herein with reference to the illustration of the drawings or in the travelable state of the vehicle.

In FIGS. 1 to 4, constitutional elements commonly used in both the first and the second embodiments are denoted by the same reference numerals.

As shown in FIGS. 1 to 4, straddle-type rough-road running vehicles 1A and 1B comprise a vehicle body frame 2 composed of, for example, a steel pipe. The vehicle body frame 2 is formed in a cage-shaped structure including: a lateral pair of upper pipes 3 substantially extending in its longitudinal running direction and having front portions bent downwardly; a lateral pair of lower pipes 4 substantially extending in its longitudinal running direction and having rear portions bent upwardly; a lateral pair of vertical pipes 5 for connecting the upper pipes 3 and the lower pipes 4 in a vertical direction in a state where a front end portion of the upper pipe 3 is connected to a front end portion of the lower pipe 4 while a rear end portion of the lower pipe 4 is connected to a substantially intermediate portion of the upper pipe 3; a lateral pair of support pipes 6 for bridging over a rear rising-up portion of the lower pipe 4 and a rear portion of the upper pipe 3; and a plurality of bridge pipes 7 for connecting the lateral pair of frame members in a width direction of the vehicle body.

At the front portion of the vehicle body frame 2, there are arranged a lateral pair of front wheels 11 provided with wide-width and low-pressure balloon tires. The front wheels 11 are arranged through a front suspension mechanism 10 including a front shock absorber 8 and a front swing arm 9.

On the other hand, at the rear portion of the vehicle body frame 2, there are arranged a lateral pair of rear wheels 15 provided with wide-width and low-pressure balloon tires. The rear wheels 15 are arranged through a rear suspension mechanism 14 including a rear shock absorber 12 and a rear swing arm 13.

An engine unit 16 is mounted on a portion between the front wheels 11 and the rear wheels 15, the portion being positioned substantially at the central portion of the vehicle body frame 2. In addition, a driver's seat 17 of straddle type is disposed on the upper rear side of the engine unit 16.

Further, in front of the engine unit 16, there is provided a steering handle 18 as a running device of the vehicles 1A and 1B. A steering shaft 20 is extended from the steering handle 18 toward a steering system supporting portion 19 provided to a front portion of the lower pipe 4.

At a front portion of the vehicle body, there is provided a front cover 21 for covering the front upper portion of the vehicle body frame 2. A front fender 22 for covering the lateral pair of the front wheels 11 is disposed to the front portion of the vehicle body, the front fender 22 being integrally formed therewith or independently formed therefrom.

At a rear portion of the vehicle body, there is provided a rear cover 23 for covering the rear upper portion of the vehicle body frame 2. A rear fender 24 for covering the lateral pair of the rear wheels 15 is disposed to the rear upper portion of the vehicle body, the rear fender 24 being integrally formed therewith or independently formed therefrom.

Furthermore, a fuel tank 25 is disposed at an upper portion of the engine unit 16, and a side cover 26 is disposed to a side portion of the engine unit 16. A step floor 27 is disposed to a portion between the front fender 22 and the rear fender 24. These covers are mold products of, for example, synthetic-resin.

The engine unit 16 is configured, for example, by integrally combining an engine body 28 with a power transmission case 29 accommodating a belt-type step-less transmission, not shown. Further, the engine body 28 is, for example, a four-stroke-cycle single-cylinder engine, and has a crankcase 30 and a cylinder assembly 31 disposed on a front side of the crankcase 30 in a horizontally set manner.

An engine intake system 32 is disposed at the rear upper portion of the cylinder assembly 31 and at the front lower portion of the driver's seat 17 of straddle type. The engine intake system 32 is connected through an intake pipe 35 to an intake port 34 formed to an upper portion of a cylinder head 33 constituting the cylinder assembly 31.

The engine intake system 32 comprises: a carburetor 36 as an intake control unit for controlling an air/fuel ratio to prepare an air/fuel mixture and for supplying the air/fuel mixture to a combustion chamber, not shown, formed within the cylinder head 33; and an air-cleaner case 37 for supplying a clean air to the carburetor 36. The carburetor 36 and the air-cleaner case 37 are connected to each other side by side in this order in the longitudinal direction, and the air-cleaner case 37 is fixed to the upper portion of the power transmission case 29 so as to constitute the engine unit 16.

Furthermore, at substantially the central portion of the vehicle body frame 2, there is formed an engine mounting portion 38 for mounting the engine unit 16 which is formed to be integrally unitized with the engine intake system 32.

The engine mounting portion 38 is formed, in a side view of the vehicle, so as to provide a frame shape opened (having an opening) such that the engine unit 16 is surrounded from a vertical direction and a longitudinal direction, and the engine body 28, the power transmission case 29 and the carburetor 36 as the intake control unit, the air-cleaner case 37 are not overlapped with each other in a longitudinal direction.

On the other hand, an engine exhaust device is disposed on one side of the engine body 28 i.e., a right side portion of the engine body 28. This engine exhaust device 39 comprises an exhaust pipe 41 connected to an exhaust port 40 formed to a lower portion of the cylinder head 33, and an exhaust silencer 42 connected to a downstream side end of the exhaust pipe 41.

The exhaust pipe 41 is formed so as to once extend toward a lower portion of the cylinder head 33, then bend to direct to a right rear portion of the vehicles 1A and 1B, and further extends from right upper side portion of the engine unit 16 in a substantially horizontal direction toward a rear portion thereof.

The exhaust silencer 42 is provided, for example, in a side view, to a portion above the rear wheel 15 and the portion below the rear fender 24 or rear cover 23. The exhaust silencer 42 is supported by the vehicle body frame 2 through, for example, a stay 43.

Further, in the engine exhaust device 39, the exhaust pipe 41 is divided in a longitudinal direction in a frame of the engine mounting portion 38 of the vehicle body frame 2 in front of the exhaust silencer 42, and in addition, a front portion of the divided exhaust pipe 41 and a rear portion of the divided exhaust pipe 41 including the exhaust silencer 42 are detachably connected by means of a joint portion 44.

On the other hand, the engine unit 16 includes a belt-cooling device 45 for introducing ambient air into the power transmission case 29 so as to cool the belt-type step-less transmission. A cooling air intake port 46 is formed to the front portion of the power transmission case 29, and a cooling air exhaust port 47 is formed to the rear portion of the power transmission case 29. The cooling air intake port 46 is connected to one side end of intake ducts 48A and 48B, and on the other hand, a cooling air exhaust air port 47 is connected to one side end of exhaust duct 49.

The intake ducts 48A and 48B and another side end of the exhaust duct 49 are respectively provided so as to extend in the vehicle body frame 2 of the engine mounting portion 38 of the vehicle body frame 2 to an upper portion of the engine unit 16.

The exhaust duct 49 is extended to a rear portion of the air-cleaner case 37 and extended toward a lower portion of the straddle type driver's seat 17, and an exhaust outlet 50 is opened at the most downstream side of the exhaust duct 49. Further, induction (intake) boxes 51A and 51B having a gas/liquid separating structure, not shown, are connected to the most upstream side of the intake ducts 48A and 48B.

Figure 2:
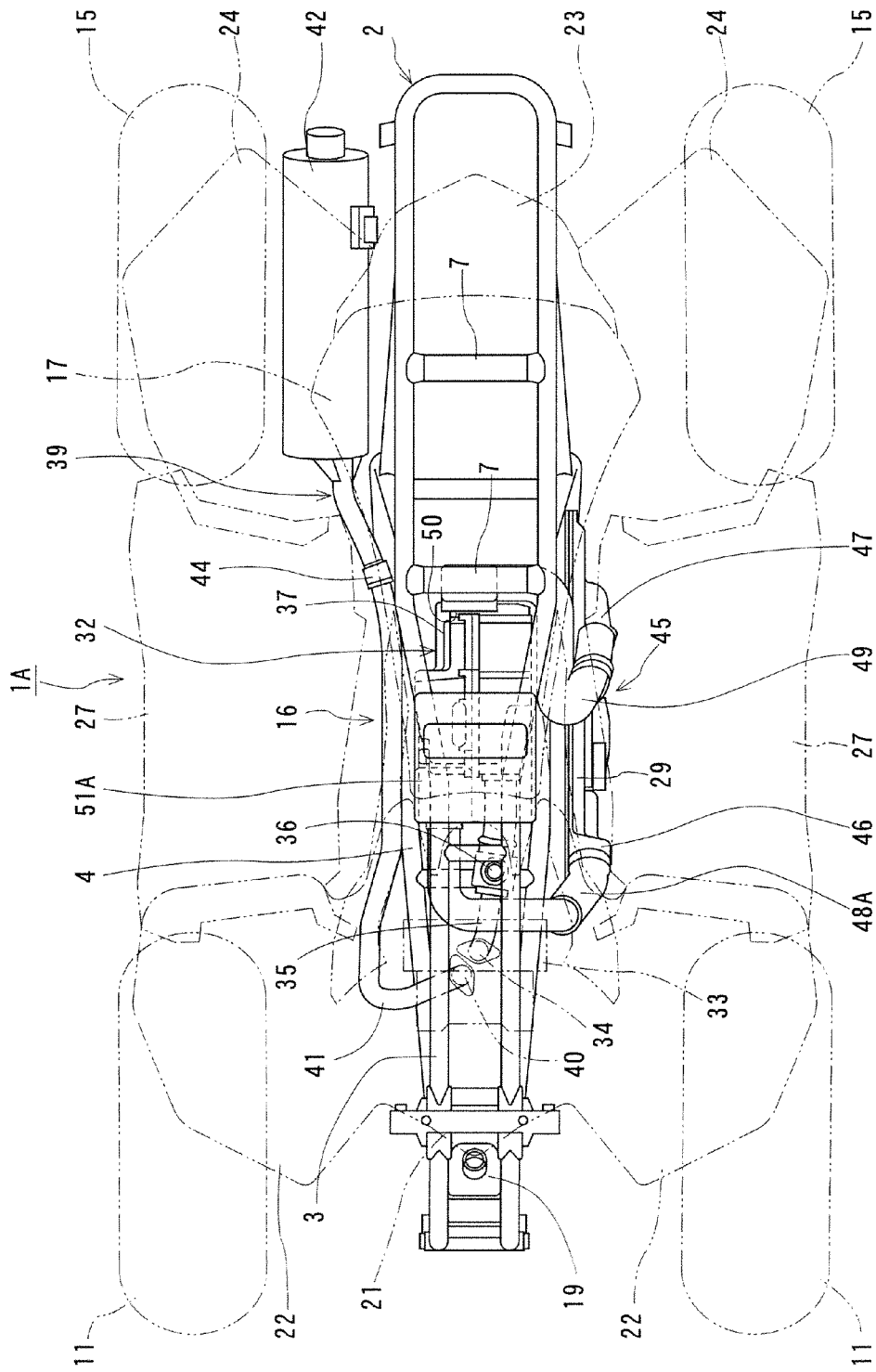
FIG. 2 is an illustration of a plan view of the straddle-type rough-road running vehicle of FIG. 1, from which a body cover is removed.

In the straddle-type rough-road running vehicle 1A according to the first embodiment shown in FIGS. 1 and 2, the induction box 51A is detachably fixed to, for example, the upper portion of the air-cleaner case 37 which constitutes the engine intake system 32, and at least the most upstream side end of the intake ducts 48A is connected to the induction box 51A. In addition, this induction box 51A is disposed so as to communicate with the air-cleaner case 37, so that the induction box 51A also exhibits the same gas/liquid separating function as that of the engine intake system 32.

Figure 3:
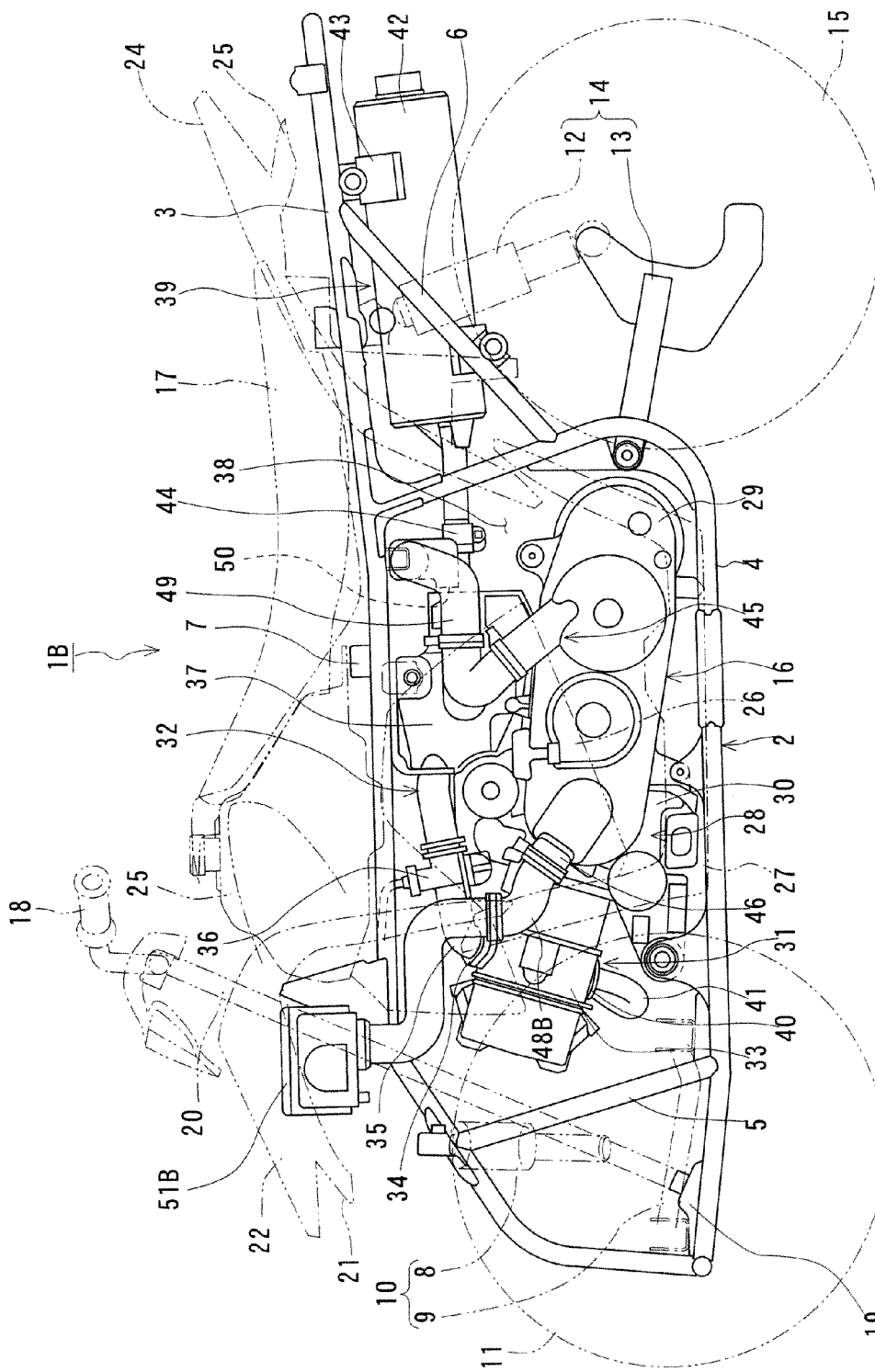
FIG. 3 is a schematic left side view of a straddle-type rough-road running vehicle, from which a body cover is removed, according to a second embodiment of the present invention.
Figure 4:
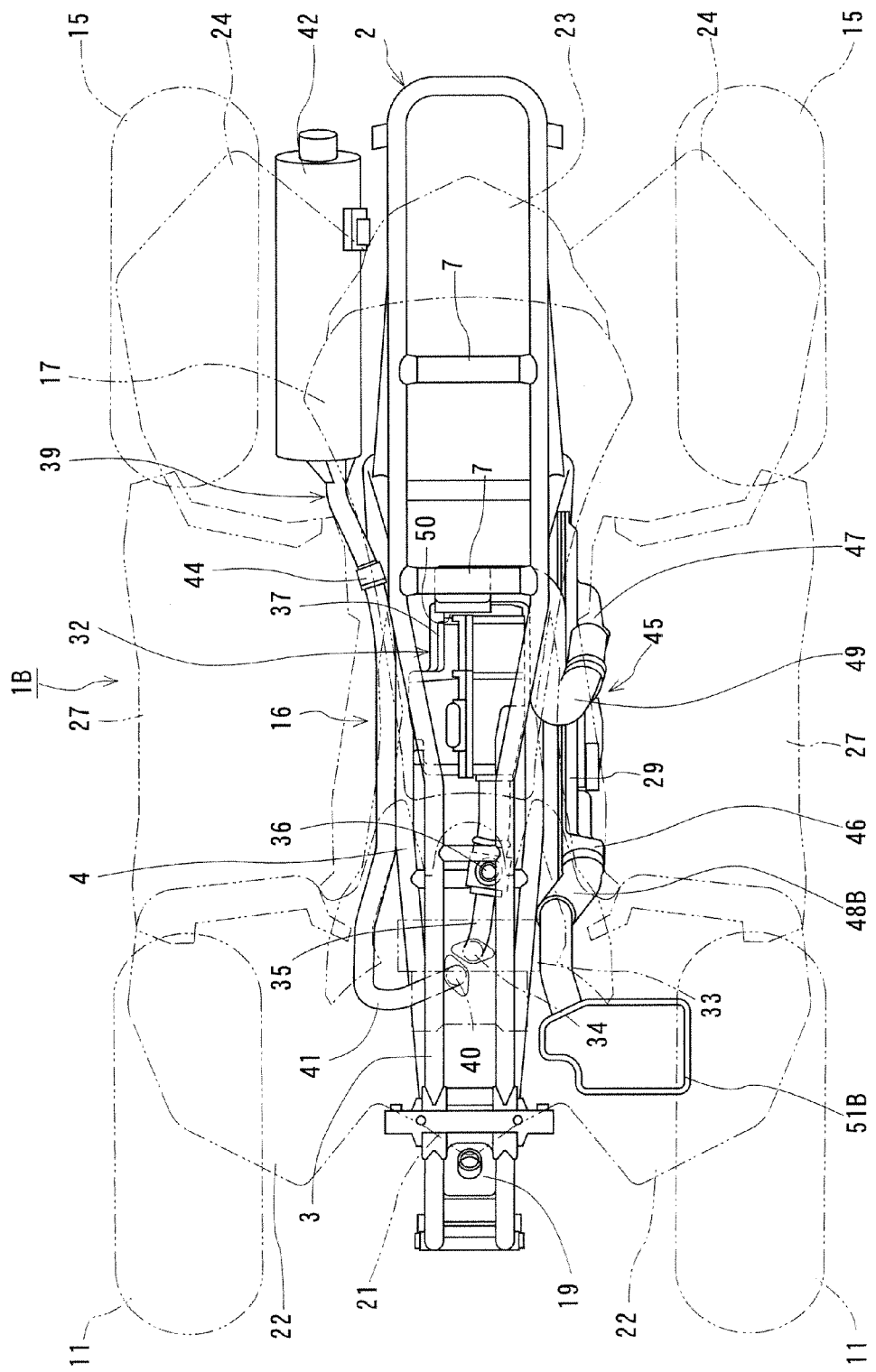
FIG. 4 is an illustration of a plan view of the straddle-type rough-road running vehicle of FIG. 3, from which a body cover is removed.

On the other hand, in the straddle-type rough-road running vehicle 1B according to the second embodiment shown in FIGS. 3 and 4, the induction box 51B is disposed in front of the engine unit 16 at one side of the lateral direction. That is, in this embodiment, the induction box 51B is disposed within the front fender 22 at a portion between the left-side front wheel 11 and a front portion of the vehicle body frame 2. In addition, at least the intake duct 48B is arranged along one side in the lateral direction, i.e. along the left side of the vehicle in this embodiment, and the intake duct 48B is connected to the induction box 51B.

The straddle-type rough road running vehicle according to the present invention of the structure mentioned above will provide the following functions.

The engine mounting portion 38 is formed at the substantially central portion of the vehicle body frame 2 so as to surround the engine unit 16 from vertical and lateral directions and to provide a frame shape opened in such manner that the engine body 28, the power transmission case 29 and the carburetor 36 as the intake control unit, and the air-cleaner case 37 are not overlapped with each other in a longitudinal direction.

According to this arrangement, it becomes possible to easily mount the engine body 28 and the engine intake system 32 onto the vehicle body frame 2 in a state where the engine body 28 and the engine intake system 32 are partially assembled in advance. As a result, the assembling performance of the vehicle body can be improved, and the vehicle can be mass-produced with high production efficiency.

Furthermore, the exhaust pipe 41 constituting the engine exhaust device 39 is divided in a longitudinal direction at a portion on the front side of the exhaust silencer 42 and in the frame of the engine mounting portion 38 formed in the vehicle body frame 2, and a front portion of the divided exhaust pipe 41 and a rear portion of the divided exhaust pipe 41 including the exhaust silencer 42 are detachably connected by means of the joint portion 44.

Accordingly, it becomes possible to easily mount the engine body 28 and the exhaust pipe 41 onto the vehicle body frame 2 in the state in which the engine body 28 and the exhaust pipe 41 are partially assembled in advance. As a result, the assembling performance of the vehicle body can be improved, and the vehicle can be mass-produced with high production efficiency.

Still furthermore, the power transmission case 29 is provided with the cooling air intake port 46 and the cooling air exhaust port 47 in a longitudinal direction, and the cooling air intake port 46 and the cooling air exhaust port 47 are respectively connected to one side ends of the intake ducts 48A and 48B and the exhaust duct 49. The other side ends of the intake duct 48A and 48B and the exhaust duct 49 are extended to an upper portion of the engine unit 16 within the frame of the engine mounting portion 38 formed in the vehicle body frame 2.

The induction box 51A and 51B having a gas/liquid separation structure is connected to the most upstream side end portion of the intake duct 48A and 48B so as to form a belt cooling device 45. Accordingly, it becomes possible to easily mount the engine body 28 and the belt cooling device 45 to the vehicle body frame 2 in the state where the engine body 28 and the belt cooling device 45 are partially assembled in advance. As a result, the assembling performance of the vehicle body can be improved, and the vehicle can be mass-produced with high production efficiency.

Still furthermore, the induction box 51A is detachably fixed to, for example, an upper surface of the air cleaner case 37 constituting the engine intake system 32 so as to connect the most upstream side end portion of the intake duct 48A.

The induction box 51A is provided so as to communicate with the air cleaner case 37 so as to provide the same function of the gas/liquid separation as that of the engine intake system 32.

Further, according to the above arrangement, the gas/liquid separation structure can be integrated into one portion unlike the conventional situation in which the gas/liquid separation structure is required to be disposed to plural portions. As a result, it becomes possible to reduce cost, parts number, total weight and assembling working required for manufacturing the vehicle.

Still furthermore, according to the arrangement mentioned above, the induction box 51A and the air cleaner case 37 can be coupled by using a minimum structure, so that the cost, parts number, total weight and assembling working required for manufacturing the vehicle can be also reduced.

In addition, the main parts or members such as the induction box 51A, the intake duct 48A and the exhaust duct 49 which have relatively a weight are disposed in the concentrated manner to the central portion of the vehicle 1A. Accordingly, the total mass of the main parts or members can be concentrated to the central portion, so that the standing stability and steering performance of the vehicle 1A can be improved.

Further, the concentrated arrangement of the main parts or members at the central portion of the vehicle body can eliminate complicated wiring or connection therebetween. That is, as shown in FIG. 2, when the intake duct 48A is disposed through a space formed between the carburetor 36 and the exhaust pipe 41, an effective utilization of the space and the mass concentration can be realized.

Still furthermore, according to this arrangement, the induction box 51B is arranged to a front side portion of the engine unit 16 and provided within a front fender 22 disposed between one of the lateral pair of front wheels 11 and a front side portion of the vehicle body frame 2. Hence, it becomes possible to prevent water splashed by the front wheel 11 from directly invading into the induction box 51B. In addition, it becomes unnecessary to adopt a layout in which the intake duct 48B passes through a narrow gap formed in the vehicle body frame 2, thus improving the assembling performance of the vehicle.

Further, in a front-side view, the engine unit 16 is not overlapped with the induction box 51B or the intake duct 48B, so that the induction box 51B or the intake duct 48B will not obstruct a running wind for cooling the engine, and accordingly, the engine can be effectively cooled by the running wind, thus well maintaining the performance of the vehicle.

It is to be noted that the present invention is not limited to the described embodiments and many other changes and modifications may be made without departing from the scopes of the appended claims.

What is claimed is:

1. A straddle-type rough-road running vehicle comprising:
a vehicle body frame including a pair of upper and lower pipes, a pair of vertical pipes, and a pair of rear rising-up portions of the lower pipes;
a lateral pair of front wheels and a lateral pair of rear wheels which are supported by the vehicle body frame;
an engine unit mounted to the vehicle body frame at substantially a central portion thereof in a longitudinal direction of the vehicle body and including an engine body and a power transmission case, in which the engine body has a cylinder assembly extending substantially along the longitudinal direction of the vehicle body, in which the cylinder assembly extends substantially along the longitudinal axis of the power transmission case from a crankcase;
a straddle type driver's seat disposed above a rear portion of the engine unit;
an engine intake system including an intake control unit for controlling an air/fuel ratio so as to prepare air/fuel mixture which is supplied into a combustion chamber disposed in the cylinder assembly and an air-cleaner case connected to the intake control unit for supplying clean air to the intake control unit the engine intake system being disposed above the engine unit, wherein the intake control unit and the air-cleaner case are connected to each other,
wherein an engine mounting portion is formed in a frame shape opened such that the engine unit is surrounded by the pair of upper and lower pipes, the pair of vertical pipes, and the pair of rear rising-up portions from a vertical direction and a longitudinal direction, the air-cleaner is disposed below the upper pipe and in front of the rear rising-up portions in a side view, the engine intake system is disposed below a perpendicular line of an axis of the cylinder assembly so as to be adjacent to the power transmission case, and the axis of the cylinder assembly and an axis of the engine intake system are formed so as to provide a substantially U-shape in the side view, and the engine unit and the engine intake system are disposed within the engine mounting portion in the side view,
wherein the straddle-type rough-road running vehicle further comprises an engine exhaust device which includes: an exhaust pipe connected to an exhaust port formed to the cylinder assembly; and an exhaust silencer connected to a downstream side end of the exhaust pipe, wherein the exhaust pipe is divided in a longitudinal direction at a portion which is a front side of the exhaust silencer and in the opened frame of the engine mounting portion formed in the vehicle body frame, and a front portion of the divided exhaust pipe and a rear portion of the divided exhaust pipe including the exhaust silencer are detachably connected by means of a joint portion, the front portion of the divided exhaust pipe being offset from the vehicle body frame in the side view, and
wherein the engine unit, the engine intake system and the front portion of the divided exhaust pipe are all composed as an assembly which can be taken out in a transverse direction through an inside of the opened frame of the engine mounting portion.

2. The straddle-type rough-road running vehicle according to claim 1, wherein the power transmission case is provided with a cooling air intake port and a cooling air exhaust port, which are respectively connected to one side ends of an intake duct and an exhaust duct, and the other side ends thereof are extended to an upper space disposed above the engine unit within the frame of the engine mounting portion formed in the vehicle body frame; and an induction box for separating a gas and a liquid from a fresh air is connected to a most upstream side end portion of the intake duct; and the induction box is detachably fixed to the air cleaner case so as to communicate with the air cleaner case so that the induction box supplies a cooling air to the power transmission case and a clean air to the intake control unit, respectively.

3. The straddle-type rough-road running vehicle according to claim 1, wherein the power transmission case is provided with a cooling air intake port and a cooling air exhaust port, which are respectively connected to one side ends of an intake duct and an exhaust duct, and other side ends thereof are extended to an upper space disposed above the engine unit within the frame of the engine mounting portion formed in the vehicle body frame; an induction box for separating a gas and a liquid from a fresh air is connected to a most upstream side end portion of the intake duct so as to supply a cooling air to the power transmission case; and the induction box is arranged outside of the frame of the engine mounting portion and provided below a front fender disposed to a portion between one of the front wheels and a front side portion of the vehicle body frame.

* * * * *